United States Patent
Hassanain et al.

(10) Patent No.: US 12,277,223 B2
(45) Date of Patent: Apr. 15, 2025

(54) SYSTEM AND METHOD UTILIZING MACHINE LEARNING AND NATURAL LANGUAGE PROCESSING TO IDENTIFY MALWARE DNA

(71) Applicant: Saudi Arabian Oil Company, Dhahran (SA)

(72) Inventors: Rayan Mohammedhassan Hassanain, Dhahran (SA); Majed Hakami, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 515 days.

(21) Appl. No.: 17/651,464

(22) Filed: Feb. 17, 2022

(65) Prior Publication Data
US 2023/0259624 A1    Aug. 17, 2023

(51) Int. Cl.
*G06F 21/56*    (2013.01)
*G06N 5/022*    (2023.01)

(52) U.S. Cl.
CPC ........... *G06F 21/566* (2013.01); *G06N 5/022* (2013.01); *G06F 2221/034* (2013.01)

(58) Field of Classification Search
CPC . G06F 21/566; G06F 2221/034; G06N 5/022; G06N 20/10
See application file for complete search history.

(56) References Cited

U.S. PATENT DOCUMENTS

| | | | |
|---|---|---|---|
| 8,635,694 B2 | 1/2014 | Malyshev et al. | |
| 9,165,142 B1 | 10/2015 | Sanders et al. | |
| 9,258,321 B2 | 2/2016 | Amsler et al. | |
| 9,294,501 B2 | 3/2016 | Mesdaq | |
| 9,519,780 B1 * | 12/2016 | Dong | H04L 63/1408 |
| 9,672,355 B2 | 6/2017 | Titonis et al. | |
| 10,104,101 B1 | 10/2018 | Thakar | |
| 10,505,960 B2 | 12/2019 | Kong | |
| 10,649,970 B1 | 5/2020 | Saxe et al. | |
| 10,659,477 B2 | 5/2020 | Choi et al. | |
| 10,708,296 B2 | 7/2020 | Apostolescu et al. | |
| 10,785,236 B2 | 9/2020 | Xu | |
| 11,442,804 B2 * | 9/2022 | Martyanov | G06F 18/24133 |
| 11,463,473 B2 * | 10/2022 | Zou | G06F 16/285 |
| 11,556,653 B1 * | 1/2023 | Han | G06F 21/577 |
| 11,580,220 B2 * | 2/2023 | Sanzgiri | H04L 63/1441 |
| 11,595,435 B2 * | 2/2023 | Singh | G06Q 10/107 |
| 11,886,586 B1 * | 1/2024 | Chang | G06F 21/568 |
| 12,086,038 B2 * | 9/2024 | Yeddu | G06N 3/082 |

(Continued)

OTHER PUBLICATIONS

Ameer; Android Ransomware Detection using Machine Learning Techniques to Mitigate Adversarial Evasion Attacks; https://thesis.cust.edu.pk/UploadedFiles/Madiha%20Thesis%20Final.pdf; 2019.

(Continued)

*Primary Examiner* — Christopher A Revak
(74) *Attorney, Agent, or Firm* — Leason Ellis LLP

(57) ABSTRACT

A system and method utilize machine learning and natural language processing to identify malware DNA of a sample malware. The sample malware is analyzed for text strings using natural language processing, and machine learning models are applied to the text strings to classify the text strings as malware DNA relative to prototype malwares.

20 Claims, 8 Drawing Sheets

(56) References Cited

U.S. PATENT DOCUMENTS

2019/0260779 A1    8/2019  Bazalgette
2022/0210188 A1*  6/2022  Grewal .............. H04L 63/1483
2022/0253691 A1*  8/2022  Rokka Chhetri ..... G06F 21/566

OTHER PUBLICATIONS

Khan; A Digital DNA Sequencing Engine for Ransomware Analysis Using a Machine Learning Network; https://bspace.buid.ac.ae/bitstream/1234/1586/3/2016146087.pdf; Feb. 2020.
Chumachenko; Machine Learning Methods for Malware Detection and Classification; https://www.theseus.fi/bitstream/handle/10024/123412/Thesis_final.pdf?sequence=1&isAllowed=y; 2017.

* cited by examiner

SYSTEM AND METHOD UTILIZING MACHINE LEARNING AND NATURAL LANGUAGE PROCESSING TO IDENTIFY MALWARE DNA

FIELD OF THE DISCLOSURE

The present disclosure relates generally to malware detection and classification, and, more particularly, to a system and method utilizing machine learning and natural language processing to identify malware DNA.

BACKGROUND OF THE DISCLOSURE

Malware is a continually evolving concern of cybersecurity. Known malware detection systems and methods focus on log analysis or statistical numerical analysis of malware computer code to establish any associations between a newly detected malware and other known malwares. It has been recognized that malware developers are similar to other software developers, in that malware developers reuse previous software code to create new malware. For example, as described in https://www.youtube.com/watch?v=Ddz_2Zfe-xY, commercially available products and services of CHECK POINT SOFTWARE TECHNOLOGIES LTD. scan computer code as a candidate malware within a code sandbox, and evaluate the candidate malware against previously known malware using code analysis and behavioral analysis. Machine learning is a technology capable of performing such code analysis of malware.

SUMMARY OF THE DISCLOSURE

According to an embodiment consistent with the present disclosure, a system and method utilize machine learning and natural language processing to identify malware DNA of a sample malware. The sample malware is analyzed for text strings using natural language processing, and machine learning models are applied to the text strings to classify the text strings as malware DNA relative to prototype malwares.

In an embodiment, a system comprises a memory, a routing engine module, an analysis module, a natural language processing module, a machine learning module, and a reporting module. The memory is configured to store a prototype malware. The routing engine module has a first processor with code therein configured to receive a sample malware. The analysis module has a second processor with code therein configured to extract information about the sample malware. The natural language processing module has a third processor with code therein configured to perform natural language processing on the sample malware and on the extracted information to extract a text string. The machine learning module has a fourth processor with code therein configured to apply a machine learning model to the text string, to compare the text string to the prototype malware, and to generate a classification of the sample malware from the comparison of the text string. The reporting module has a fifth processor with code therein configured to generate malware DNA information including the classification of the sample malware.

The system also includes an input module having a sixth processor with code therein configured to receive the sample malware and to provide the sample malware to the routing engine module. The routing engine module outputs the malware DNA information to an external system. The system also includes an output module having a sixth processor with code therein configured to output the malware DNA information. The malware DNA information is output in a visualization in the form of a double helix. Alternatively, the malware DNA information is output in a report. The report lists, as the malware DNA, a percentage of similarity of the sample malware to the prototype malware. Alternatively, the output module includes a user interface (UI) viewable by a user to view the malware DNA information.

In another embodiment, a method comprises storing a prototype malware in a memory, receiving a sample malware, extracting information about the sample malware, performing natural language processing on the sample malware and on the extracted information to extract a text string, applying a machine learning model to the text string, comparing the text string to the prototype malware, generating a classification of the sample malware from the comparison of the text string, generating malware DNA information including the classification of the sample malware, and outputting the malware DNA information.

The sample malware is received from a user. The malware DNA information is output to an external system. Alternatively, the malware DNA information is output in a visualization in the form of a double helix. In addition, the malware DNA information is output in a report. The report lists, as the malware DNA, a percentage of similarity of the sample malware to the prototype malware. Furthermore, the outputting is performed with a user interface (UI) viewable by a user to view the malware DNA information.

In a further embodiment, a non-transitory computer readable medium comprises computer-executable instructions which, when executed, configure a processor to store a prototype malware in a memory, receive a sample malware, extract information about the sample malware, perform natural language processing on the sample malware and on the extracted information to extract a text string, apply a machine learning model to the text string, compare the text string to the prototype malware, generate a classification of the sample malware from the comparison of the text string, generate malware DNA information including the classification of the sample malware, and output the malware DNA information.

The malware DNA information is output in a visualization in the form of a double helix. Alternatively, the malware DNA information is output in a report. The report lists, as the malware DNA, a percentage of similarity of the sample malware to the prototype malware. The outputting is performed with a user interface (UI) viewable by a user to view the malware DNA information.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Figure 1:
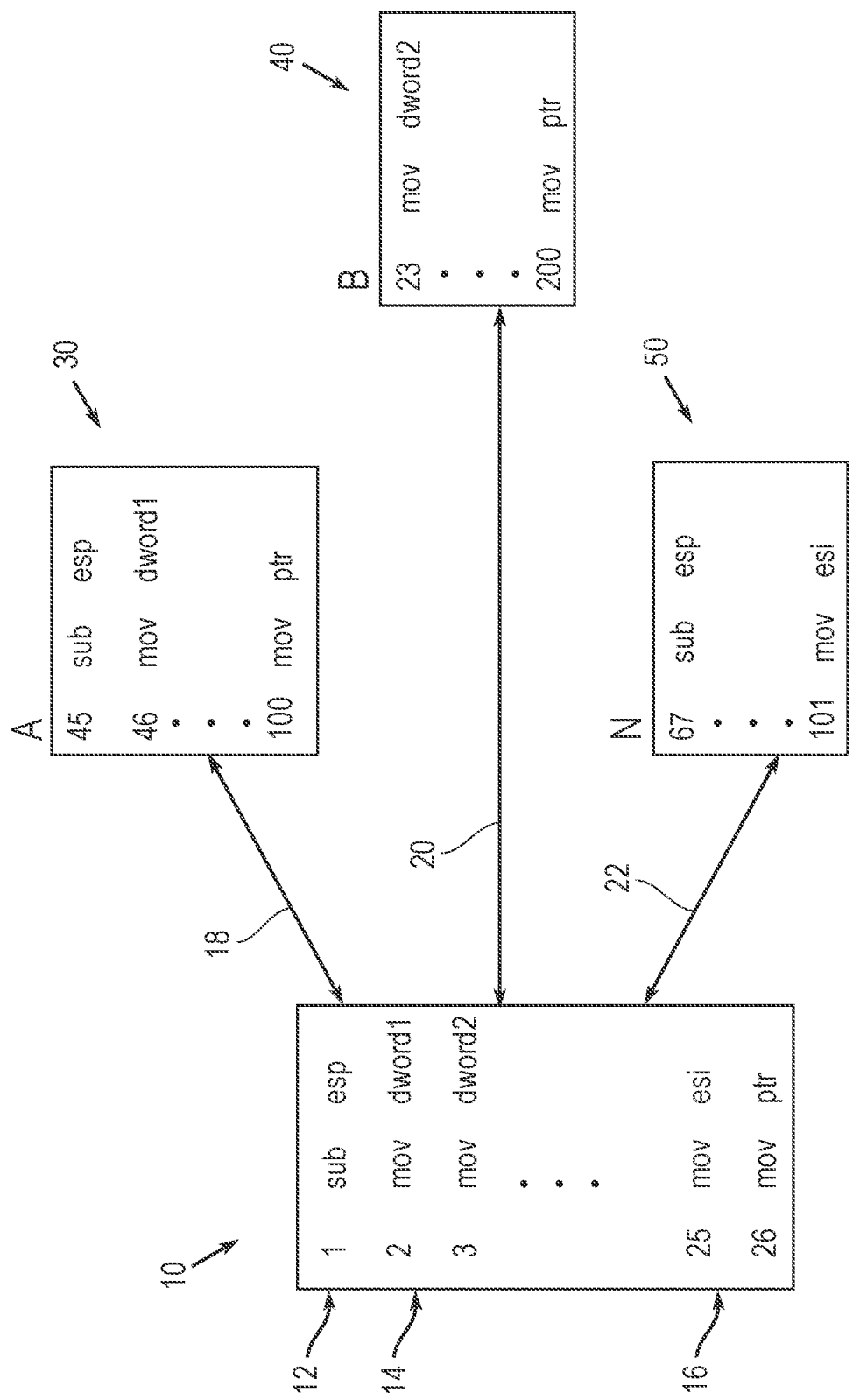
FIG. 1 is a schematic illustrating comparison of a sample malware to prototype malwares.

Example embodiments consistent with the teachings included in the present disclosure are directed to a system and method utilizing machine learning and natural language processing to identify malware DNA and to classify a sample malware relative to known malwares by malware DNA. A malware DNA is information indicating similarities of a set of known prototype malwares compared to a sample malware submitted by an analyst or other systems. For example, a percentage can be associated with each prototype malware indicating a degree of similarity of the prototype malware to the sample malware. As shown in FIG. 1, a sample malware 10 having lines 12, 14, 16 of code is compared 18, 20, 22 to each prototype malware 30, 40, 50 in a database, labeled A, B, to N, respectively. For example, line 1 of the sample malware 10 is a line 12 of code "sub esp", which is identical to line 45 of the prototype malware 30, and also identical to line 67 of the prototype malware 50. Accordingly, the malware DNA indicates such a similarity between the sample malware 10 and the prototype malwares 30, 50. In this example, the code reading "sub esp" can be absent from the prototype malware 40. That is, no line of code in the prototype malware 40 is similar or identical to the code "sub esp" in the sample malware 10. The malware DNA indicates such a lack of similarity of the sample malware 10 and the prototype malware 40 in regard to the example code "sub esp" being compared.

Figure 2:
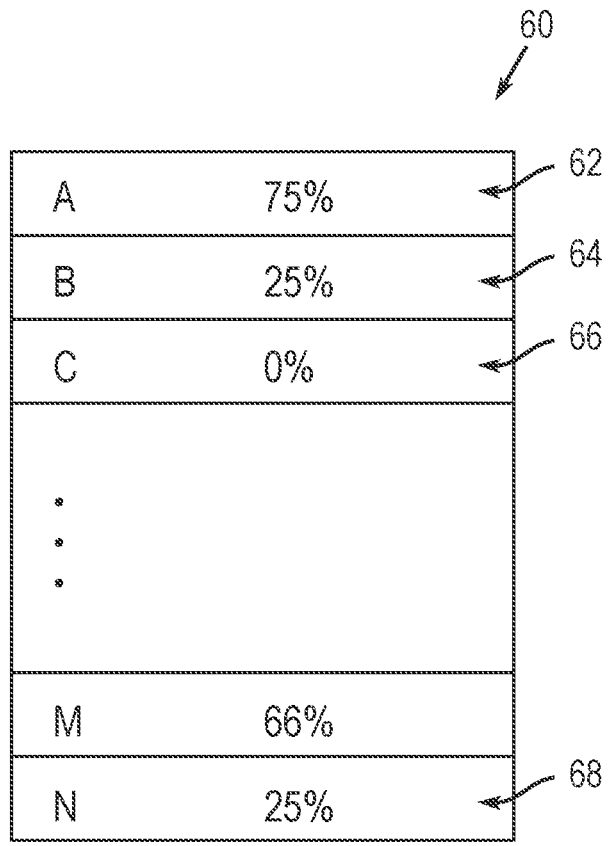
FIG. 2 is a report illustrating malware DNA of the sample malware.
Figure 3:
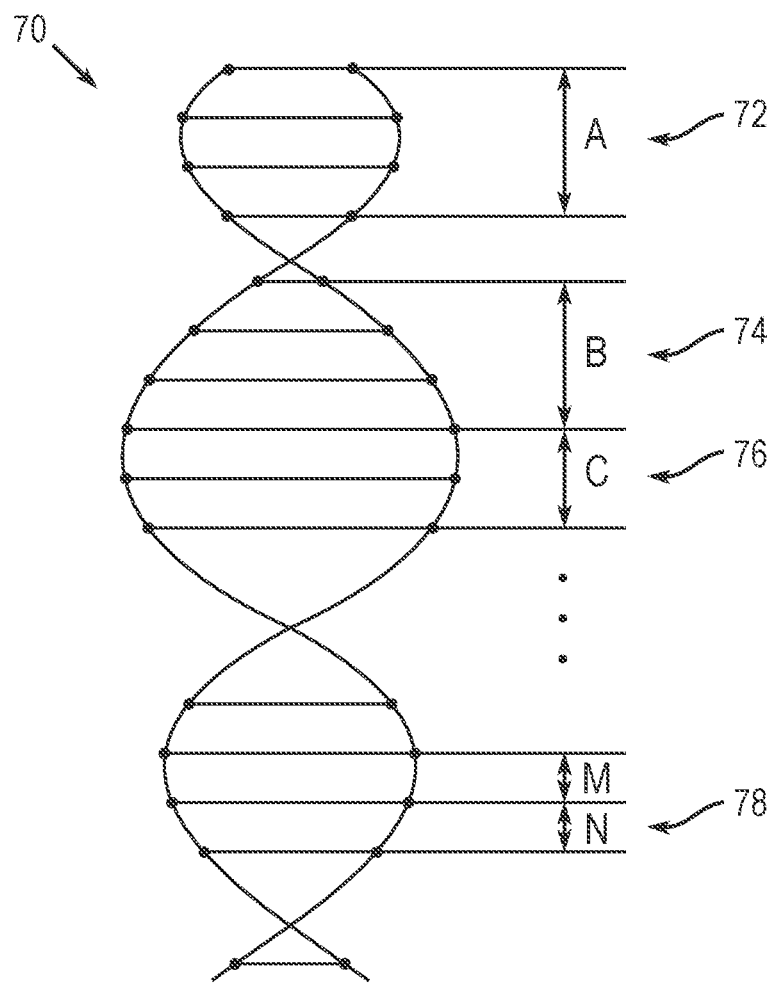
FIG. 3 is a visualization illustrating the malware DNA of FIG. 2 in a double helix format.

After determining percentages of code shared by the sample malware 10 and each prototype malware 30, 40, 50, a report 60 can be generated, as shown in FIG. 2, illustrating a percentage similarity 62, 64, 66, 68 of the sample malware to each prototype malware labeled A, B, C, etc., up to the prototype malware labeled N, respectively. The percentages with reference to each prototype malware are the malware DNA. Alternatively, the malware DNA can be processed by a programmed computer processor for visualization on a display screen in the form of a double helix 70, as shown in FIGS. 3-4, to simulate biological deoxyribonucleic acid (DNA) but with prototype malware labels, such as the labels 72, 74, 76, 78 instead of nucleobases.

Figure 4:
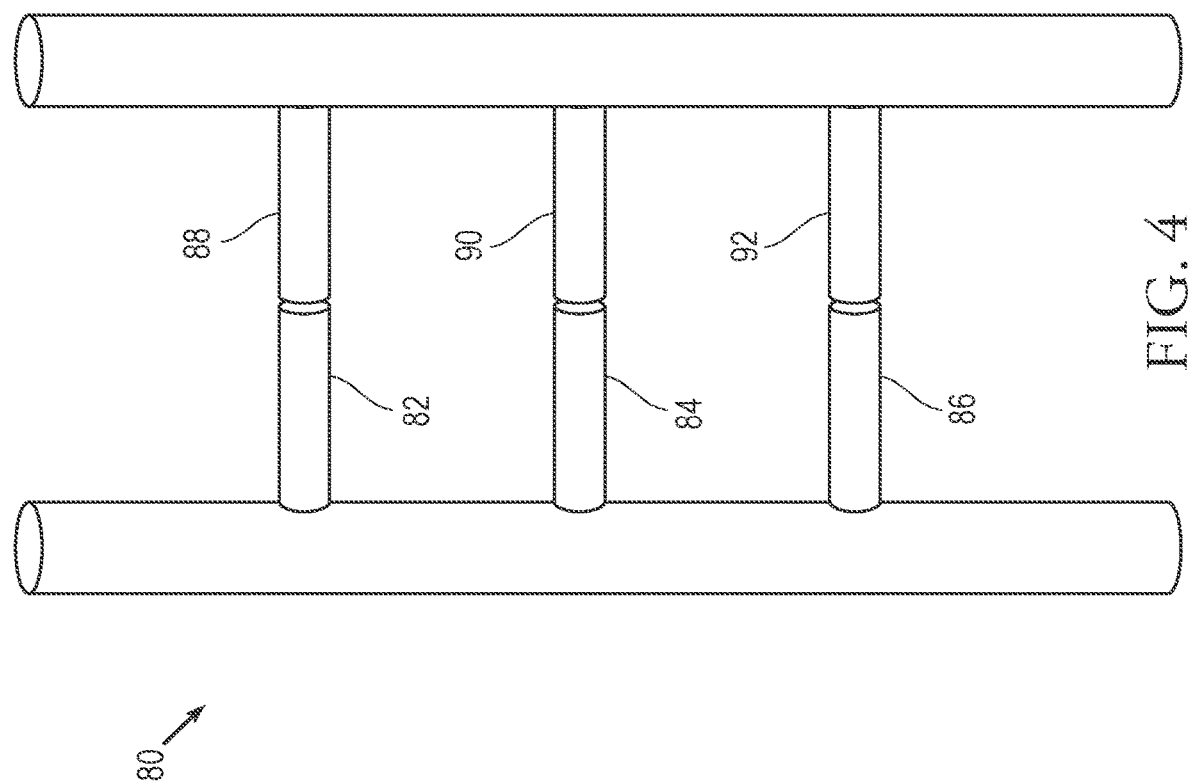
FIG. 4 is another visualization illustrating the malware DNA of FIG. 2.

In another representation shown in FIG. 4, the main user interface (UI) visualization 80 is similarly DNA-based, and is divided into three main components organized by the processor to be displayed as: a malware DNA header section 82, a malware DNA body section 84, and a malware DNA footer section 86. A malware DNA header 88 is matched with the malware DNA header section 82 to represent that the detected malware is similar to malware family X based on the header of the malware. A malware DNA body 90 is matched with the malware DNA body section 84 to represent that the detected malware is similar to malware family Y based on the body of the malware. A malware DNA footer 92 is matched with the malware DNA footer section 86 to represent that the detected malware is similar to malware family Z based on the footer of the malware.

The malware DNA header 88 includes a malware magic number, imported libraries, and cryptographic algorithms used in the malware. The magic number is a string that indicates a file type. The imported libraries and the cryptographic algorithm can be determined from a static analysis tool provided by a quick analysis module 140 shown in FIG. 5. The malware DNA body 90 includes malware content, such as ASCII strings, registry keys, processes trees, shell commands, and malware command-and-control servers. Such information about the malware DNA body 90 can be determined from sandbox computing environment. Alternatively, such information about the malware DNA body 90 can be determined by code executing in a processor from data in the memory from capability extraction reports provided by the quick analysis module 140. The malware DNA footer 92 includes metadata information such as a file author, a creation time, and file version information. Such metadata information can be determined from a metadata extraction tool provided by the quick analysis tool 140.

Figure 5:
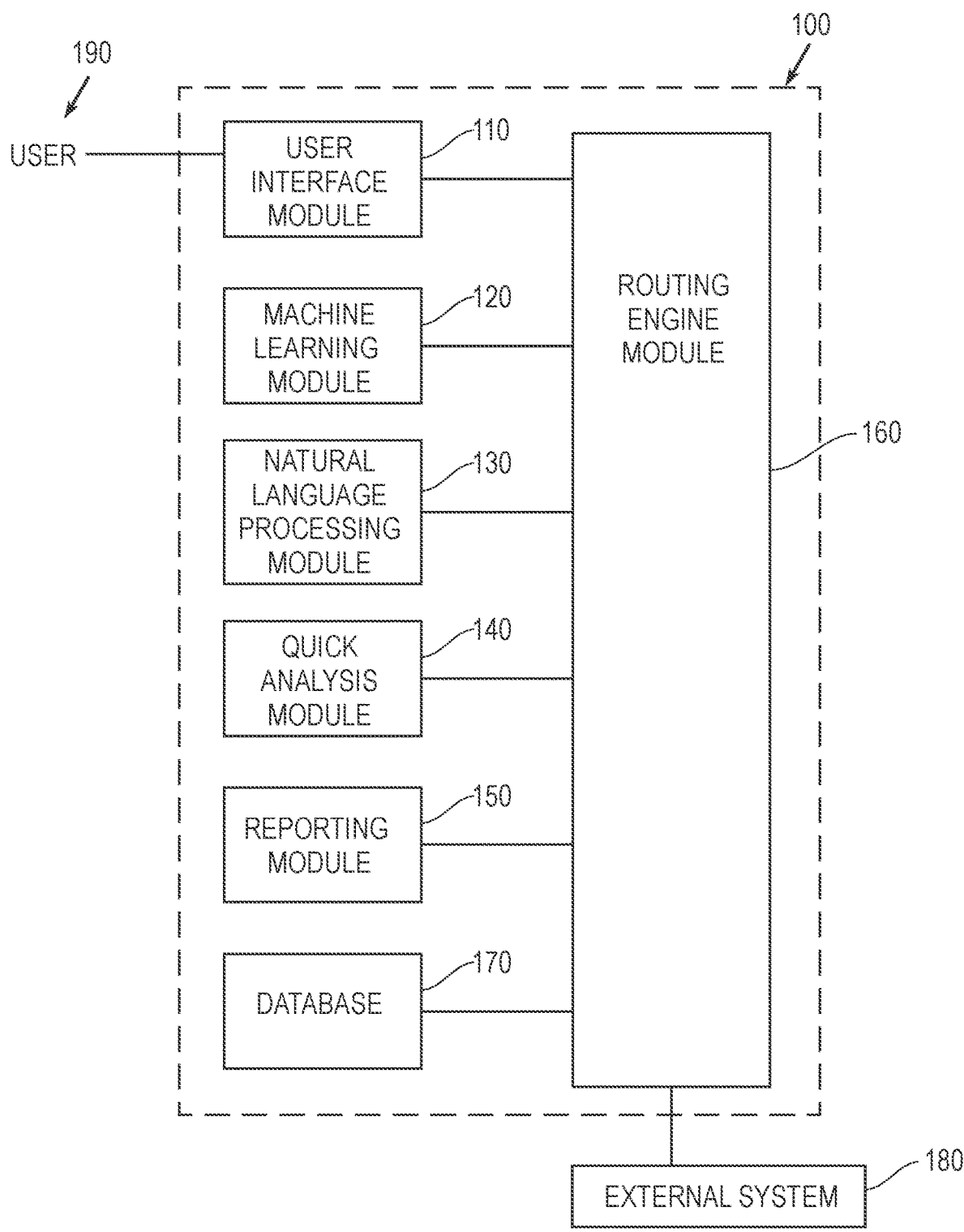
FIG. 5 is a schematic of a system configured to analyze the sample malware, according to an embodiment.
Figure 6:
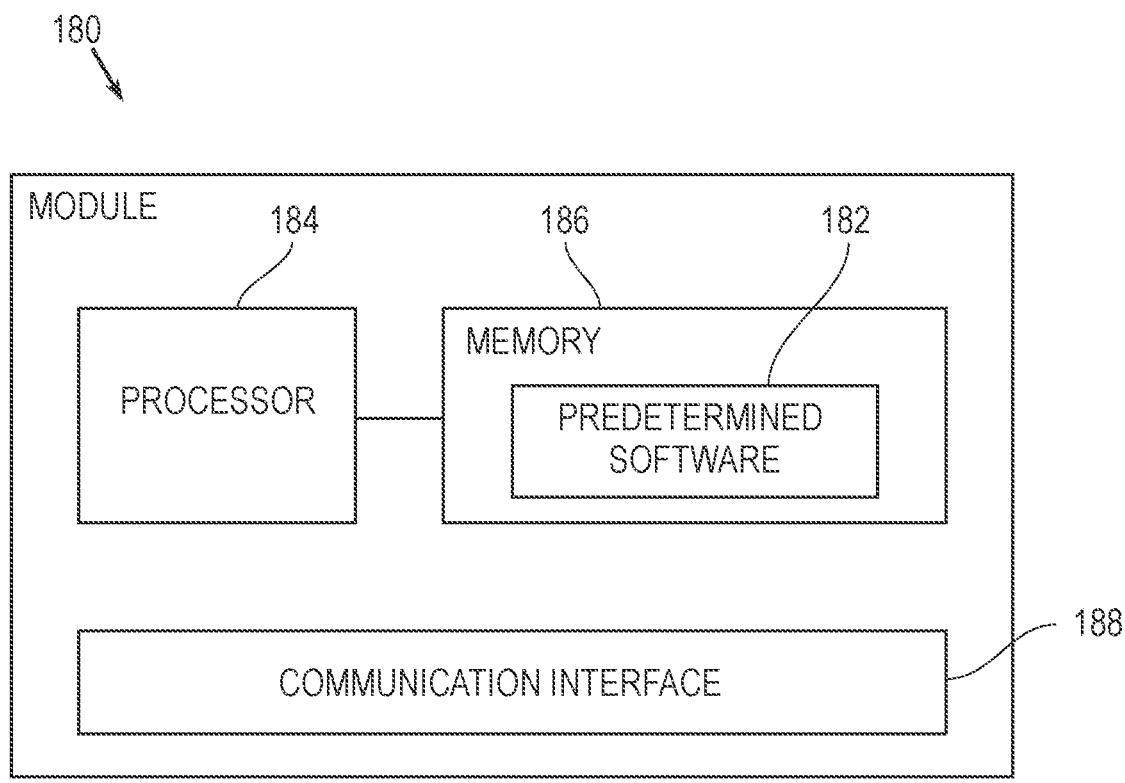
FIG. 6 is a schematic of a module utilized in the system of FIG. 4.

Referring to FIG. 5, a system 100 has a plurality of modules 110, 120, 130, 140, 150, 160, including a user interface (UI) module 110, a machine learning (ML) module 120, a natural language processing (NLP) module 130, the quick analysis module 140, a reporting module 150, and a routing engine module 160. The system 100 also includes a database 170 having memory configured to store information about known malware and historical datasets, such as the prototype malwares 30, 40, 50 shown in FIG. 1. The system 100 can be connected to an external system 180, described in greater detail below. Each of the modules 110, 120, 130, 140, 150, 160 can be implemented as a state machine. One or more of the state machine-based modules 110, 120, 130, 140, 150, 160 can reside in a cloud service. Alternatively, each of the modules 110, 120, 130, 140, 150, 160 can be implemented as predetermined software 182 executed by a processor 184 and stored in a memory 186, as shown in FIG. 6. In another embodiment, the predetermined software 182 can be stored in a memory internal to the processor 184. Referring to FIG. 6, each of the modules 110, 120, 130, 140, 150, 160 also includes a communication interface 188 for transmitting and receiving data within the system 100.

The user interface (UI) module 110 allows a user 190 to input data to the system 100. The UI module 110 also allows the user 190 to receive outputs from the system 100. For example, the UI module 110 can be connected to a display for displaying a graphical user interface (GUI) to the user 190. The GUI can allow both inputs to and outputs from the system 100. The display can include a touchscreen configured to receive the inputs from the user 190, as well as to display the outputs to the user 190. The UI module 110 allows the user 190 to submit a computer program or code as sample malware to be evaluated. For example, the input data to the UI module 110 can be software code representing a portion of or an entire new sample of malware. The UI module 110 also allows the user 190 to view prior malware submissions. The prior malware submissions can be stored in the database 170. Alternatively, the prior malware submissions can be provided to the UI module 110 by the NLP module 130 to allow the user 190 to rapidly search historical malware datasets. The NLP module 130 can search human speech in the historical data stored in the database 170. Alternatively, the NLP module 130 can perform text-based searches in the historical data stored in the database 170. The UI module 110, in conjunction with the NLP module 170, can perform correlations, visualizations, and data exploration. Additionally, the UI module 110 allows for reporting, alerting, logging, and status of current jobs and processes. Furthermore, the UI module 110 allows for visualizations of the resulting datasets in various standard industry graphing approaches used in intelligence and data exploration. For example, the UI module 110 can visualize the sample malware 10 in a report 60, as shown in FIG. 2. In addition, the UI module 110 can visualize the sample malware 10 as a DNA-like visualization 70, as shown in FIG. 3. The visualization 70 of the sample malware 10 in FIG. 3 can be color coded. For example, referring to FIG. 2, since the sample malware 10 has high percentages of similarity with malwares A and M, the colors of the malware sections A and M in the malware DNA 70 in FIG. 3 can be colored red. Similarly, since the sample malware 10 has a moderate percentage of similarity with malwares B and N, the colors of the malware sections B and N in the malware DNA 70 in FIG. 3 can be colored yellow. In addition, since the sample malware 10 has a low or zero percentage of similarity with the malware C, the color of the malware section C in the malware DNA 70 in FIG. 3 can be colored green.

In one embodiment, the UI module 110 includes a RESTful application programming interface (API). The RESTful API is an API for World Wide Web-based services using representational state transfer (REST), which is a software architectural style that uses a subset of hypertext transfer protocol (HTTP). Using the RESTful API, the UI module 110 is capable of interfacing with a variety of input sources including, but not limited to, commercial security products, open-source solutions, and direct analyst access for automation of various tasks. The input sources can be included as an external system 180.

Referring again to FIG. 5, the routing engine module 160 is a central routing mechanism for requests and data between the modules 110, 120, 130, 140, 150. Requests and data are passed from the UI module 110 to the routing engine module 160 which performs routing, orchestration, job control, and status updates. Additionally, the routing engine module 160 performs routing of the datasets between the other modules 110, 120, 130, 140, 150, handles orchestration of the flow and steps between the other modules 110, 120, 130, 140, 150, and handles job control and job status updates. The routing engine module 160 provides a central mechanism to receive logs, updates, and results to be sent back for use by the UI module 110 to represent the data and results to the user 190, or to be returned via the RESTful API to an external system 180 such as a security incident and event management (SIEM) system, other third-party security solutions, and other external artificial intelligence and ML-based solutions that submit and utilize the results as part of routine, daily cybersecurity operations to defend organizations against malicious adversaries. The routing engine module 160 can be implemented as any known bus architecture.

The quick analysis module 140 processes the sample malware 10, and extracts file metadata and information, multiple anti-virus (AV) scans, a malware file header, an indication of the packer used, cryptographic algorithms, behavior information, and de-obfuscated data. The processed sample malware 10 and associated information is routed back to the NLP module 130 using the routing engine module 160.

The NLP module 130 uses known natural language processing techniques to extract text strings from the sample malware 10 and from the output of the quick analysis module 140. The text strings can be in ASCII format. For example, referring to FIG. 1, the NLP module 130 can extract "sub", "mov", and "ptr", as well as other text strings. In the case of "sub", the NLP module 130 can equate this string as an assembly language abbreviation of the English word "subroutine". In the case of "mov", the NLP module 130 can equate this string as an assembly language abbreviation of the English word "move". In the case of "ptr", the NLP module 130 can equate this string as an assembly language abbreviation of the English word "printer". Other text strings in the sample malware 10, such as "esp", "dword1", "dword2", and "esi", can also be recognized by the NLP module 130. The NLP module 130 then outputs a summary of the extracted strings. The output of the summary is further processed to remove unimportant strings and to retain the important strings. For example, duplicate strings are removed to retain one copy of a given string. However, single or unique strings are retained as important strings.

The processed summary includes intelligence and forensic artifacts of the sample malware 10. The processed summary is transferred through the routing engine module 160 to the machine learning module 120. The machine learning module 120 performs parsing, feature extraction, and vectorization of the processed summary to further process the summary. The final processed summary is input to and ingested by various machine learning models implemented by the machine learning module 120. The machine learning module 120 utilizes known machine learning models to statistically associate the resulting dataset in the summary and submitted sample malware 10 to all relevant prototype malwares 30, 40, 50 in the database 170. In one embodiment, the machine learning module 120 can implement and train artificial neural networks to perform machine learning to generate the summary. Alternatively, the machine learning module 120 can implement a support-vector machine (SVM) to perform the machine learning to generate the summary. Other known machine learning models can also be used by the machine learning module 120. The input of the machine learning module 120 is the output of the quick analysis module 140, the NLP module 130, and the sample malware 10 itself.

Using the machine learning models, the machine learning module 120 generates the percentages of similarity of the sample malware 10 to the prototype malwares 30, 40, 50, such as the percentages 62, 64, 66, 68 shown in FIG. 2. For example, using artificial neural networks, the machine learning module 120 can classify each text string in the sample malware 10 as being similar or identical to lines of code in one or more prototype malwares 30, 40, 50. The results generated by the machine learning module 120 are sent back to the routing engine module 160 for updates and further analysis and for reporting to the user by the reporting module 150.

Figure 7:
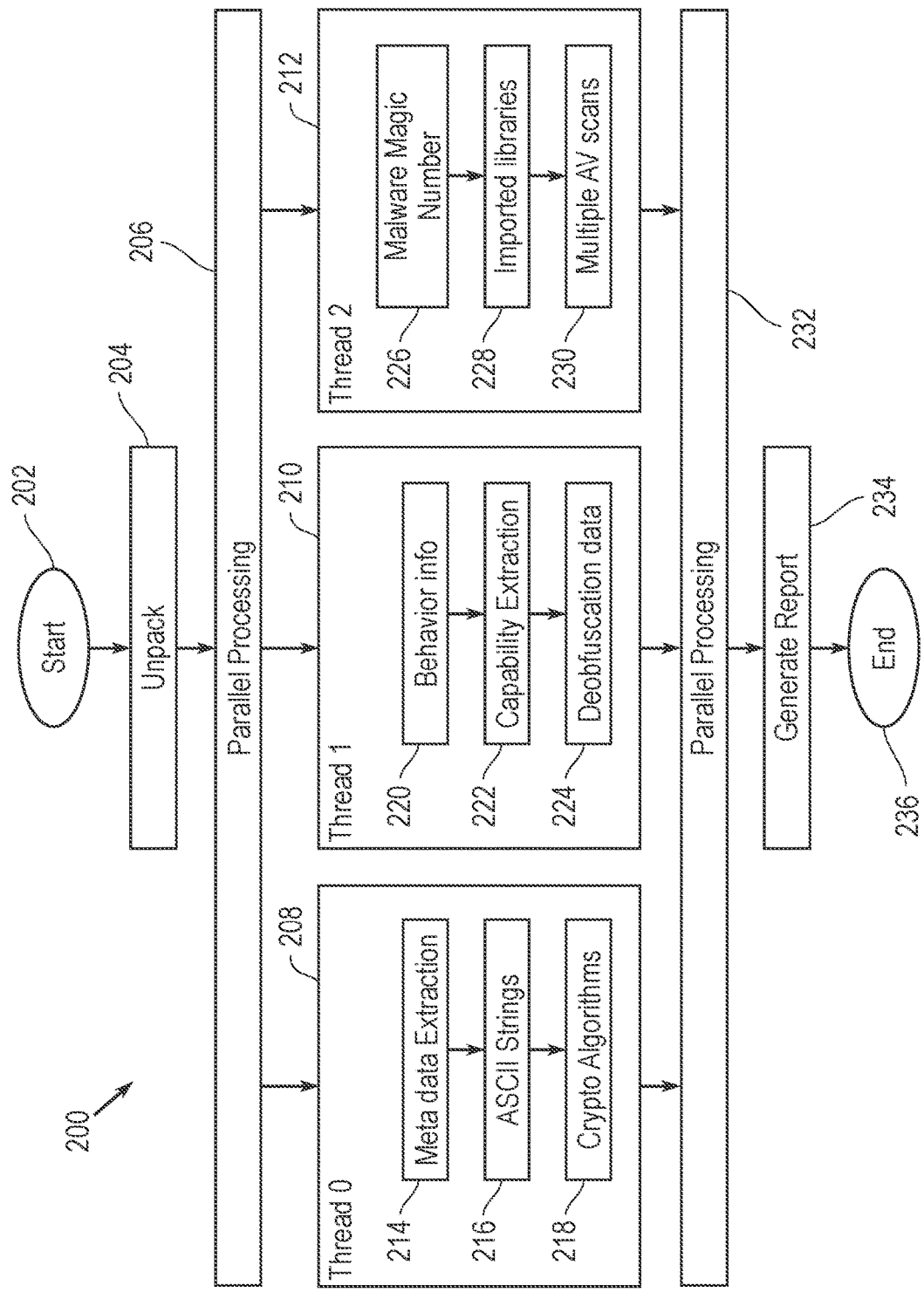
FIG. 7 is a flowchart of operation of a machine learning module.

The machine learning module 120 correlates the malware similarity determination based on the factors described above, such as the factors of a header, a body, and a footer using a processor suitably configured by code to perform the correlation. The output of the machine learning module 120 is a report or notification of the similarity of each of the header, body, and footer components, with the data of the report in a memory accessible by the processor. Referring to FIG. 7, a method 200 of operation of the machine learning module 120 starts in step 202, and unpacks or otherwise pre-processes the sample malware to be evaluated in step 204. The method 200 then performs parallel processing in step 206 to branch out the machine learning processing into multiple threads 208, 210, 212, such as thread 0, thread 1, and thread 2, respectively. In thread 208, metadata extraction is performed in step 214, ASCII strings are determined in step 216, and cryptographic algorithms are determined in step 218. In thread 210, behavior information is determined in step 220, capability extraction is performed in step 222, and de-obfuscation data is determined in step 224. In thread 212, a malware magic number is determined in step 226, imported libraries are determined in step 228, and multiple anti-viral (AV) scans are performed in step 230. All such determinations are performed by a programmed processor using the data of the sample malware and the machine processing/metadata extracted information. The results of the steps 214-230 are parallel processed in step 232 to be compiled in a report generated in step 234. The method 200 then ends in step 236.

The reporting module 150 generates alerts, dashboards, analysis reports, and emails for analysts, system administrators, and external systems 180 utilizing the RESTful API for further review and action. All of the modules 110, 120, 130, 140, 150, 160 are capable of generating logs, events, and alerts using any known type of logging module to provide access control, health monitoring, and auditing of the system 100. The reporting module 150 receives results generated by the machine learning module 120 to generate the report 60 in FIG. 2 in a user interface displayed by the UI module 110. Alternatively, the reporting module 150 receives results generated by the machine learning module 120 to generate the visualization 70 of malware DNA in FIG. 3 in a user interface displayed by the UI module 110. Such generated logs, events, and alerts are routinely returned to the routing engine module 160 to be routed back to the UI Module 110 for access by the user 190. Alternatively, the routing engine module 160 routes the generated logs, events, and alerts to the external system 180. Accordingly, the routing engine module 160 provides status and data back to the external system 180 and the UI module 110.

Figure 8:
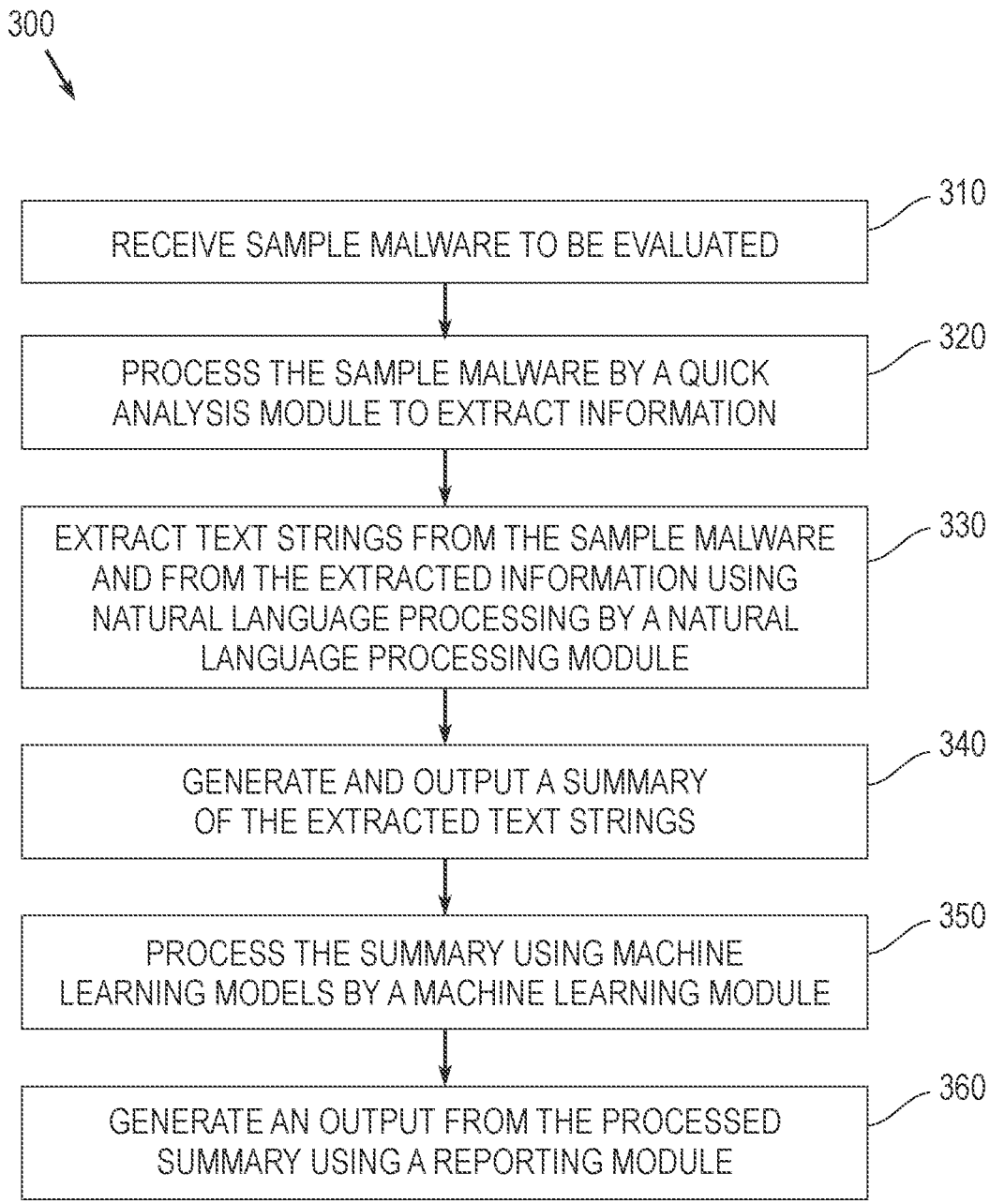
FIG. 8 is a flowchart of a method configured to analyze the sample malware using the system of FIG. 5.

As shown in FIG. 8, a method 300 includes the step 310 of receiving a sample malware 10 to be evaluated. The receiving can be performed through the UI module 110. Alternatively, the receiving can be through the external system 180. The method 300 then performs step 320 of processing the sample malware 10 by the quick analysis module 140 to extract information. Then the method 300 performs step 330 to extract text strings from the sample malware and from the extracted information using natural language processing by the natural language processing module 130. A summary of the extracted text strings is generated and output by the natural language processing module 130 in step 340. The summary is then processed in step 350 using machine learning models by the machine learning module 120.

An output is then generated in step 360 from the processed summary using a reporting module 150. The output can be the report 60 as shown in FIG. 2. The report 60 can be displayed to the user 190 by the UI module 110 using any known display technology. Alternatively, the report 60 can be printed by the UI module 110 using any known printing technology, such as a printer. Otherwise, the report 60 can be transmitted to the external system 180. In another embodiment, the output can be a visualization 70 of malware DNA of the sample malware 10 compared to the prototype malwares 30, 40, 50 as shown in FIG. 3. The visualization 70 can be displayed to the user 190 by a display included in or connected to the UI module 110. For example, the display can be a multicolor display, and the visualization 70 of the malware DNA is displayed with the prototype malwares 30, 40, 50 being color coded. Alternatively, the visualization 70 can be printed by the UI module 110. In an example embodiment, the UI module 110 can include or can be connected to a multicolor printer to print the visualization 70 of the malware DNA with prototype malwares 30, 40, 50 being color coded. Otherwise, the visualization 70 can be transmitted to the external system 180.

Portions of the methods described herein can be performed by software or firmware in machine readable form on a tangible (e.g., non-transitory) storage medium. For example, the software or firmware can be in the form of a computer program including computer program code adapted to cause the system and method to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The terms "computer" or "computing device," as used in this disclosure, means any machine, device, circuit, component, or module, or any system of machines, devices, circuits, components, or modules that are capable of manipulating data according to one or more instructions. The terms "computer" or "computing device" include, for example, without limitation, a processor, a microprocessor (uC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, uCs, CPUs, GPUs, ASICs, general purpose computers, super computers, personal computers, laptop computers, palmtop computers, notebook computers, desktop computers, workstation computers, or servers.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, for example, an application program that can accept connections to service requests from clients by sending back responses to the clients. The database can be configured to run the at least one application, often under heavy workloads, unattended, for extended periods of time with minimal human direction.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system, comprising:
   a memory configured to store a prototype malware;
   a routing engine module having a first processor with code therein configured to receive a sample malware;
   an analysis module having a second processor with code therein configured to extract information about the sample malware;
   a natural language processing module having a third processor with code therein configured to perform natural language processing on the sample malware and on the extracted information to extract a text string to be a summary of the sample malware;
   a machine learning module having a fourth processor with code therein configured to apply a machine learning model to the text string, to compare the text string as the summary of the sample malware to the prototype malware using the machine learning model, and to generate a classification of the sample malware from the comparison of the text string as the summary of the sample malware to the prototype malware; and
   a reporting module having a fifth processor with code therein configured to generate malware DNA information including the classification of the sample malware.

2. The system of claim 1, further comprising:
   an input module having a sixth processor with code therein configured to receive the sample malware and to provide the sample malware to the routing engine module.

3. The system of claim 1, wherein the routing engine module outputs the malware DNA information to an external system.

4. The system of claim 1, further comprising:
   an output module having a sixth processor with code therein configured to output the malware DNA information.

5. The system of claim 4, wherein the malware DNA information is output in a visualization in the form of a double helix.

6. The system of claim 4, wherein the malware DNA information is output in a report.

7. The system of claim 6, wherein the report lists, as the malware DNA, a percentage of similarity of the sample malware to the prototype malware.

8. The system of claim 4, wherein the output module includes a user interface (UI) viewable by a user to view the malware DNA information.

9. A method, comprising:
   storing a prototype malware in a memory;
   receiving a sample malware;
   extracting information about the sample malware;
   performing natural language processing on the sample malware and on the extracted information to extract a text string to be a summary of the sample malware;
   applying a machine learning model to the text string;
   comparing the text string as the summary of the sample malware to the prototype malware using the machine learning model;
   generating a classification of the sample malware from the comparison of the text string as the summary of the sample malware to the prototype malware;
   generating malware DNA information including the classification of the sample malware; and
   outputting the malware DNA information.

10. The method of claim 9, wherein the sample malware is received from a user.

11. The method of claim 9, wherein the malware DNA information is output to an external system.

12. The method of claim 9, wherein the malware DNA information is output in a visualization in the form of a double helix.

13. The method of claim 9, wherein the malware DNA information is output in a report.

14. The method of claim 13, wherein the report lists, as the malware DNA, a percentage of similarity of the sample malware to the prototype malware.

15. The method of claim 9, wherein the outputting is performed with a user interface (UI) viewable by a user to view the malware DNA information.

16. A non-transitory computer readable medium comprising computer-executable instructions which, when executed, configure a processor to:
   store a prototype malware in a memory;
   receive a sample malware;
   extract information about the sample malware;
   perform natural language processing on the sample malware and on the extracted information to extract a text string to be a summary of the sample malware;
   apply a machine learning model to the text string;
   compare the text string as the summary of the sample malware to the prototype malware using the machine learning model;
   generate a classification of the sample malware from the comparison of the text string as the summary of the sample malware to the prototype malware;
   generate malware DNA information including the classification of the sample malware; and
   output the malware DNA information.

17. The computer readable medium of claim 16, wherein the malware DNA information is output in a visualization in the form of a double helix.

18. The computer readable medium of claim 16, wherein the malware DNA information is output in a report.

19. The computer readable medium of claim 18, wherein the report lists, as the malware DNA, a percentage of similarity of the sample malware to the prototype malware.

20. The computer readable medium of claim 16, wherein the outputting is performed with a user interface (UI) viewable by a user to view the malware DNA information.

* * * * *